Sept. 20, 1971      J. J. MORRONE      3,606,084

DRINK DISPENSERS AND COUNTER

Filed Dec. 15, 1969

INVENTOR
JOHN J. MORRONE
BY

ATTORNEY

United States Patent Office 3,606,084
Patented Sept. 20, 1971

3,606,084
DRINK DISPENSERS AND COUNTER
John J. Morrone, 114 Payson Ave.,
Audubon, N.J. 08106
Filed Dec. 15, 1969, Ser. No. 884,917
Int. Cl. B67d 5/22
U.S. Cl. 222—38
6 Claims

ABSTRACT OF THE DISCLOSURE

A drink dispenser and counter is provided having a housing with a spout and within the housing a measuring chamber with controlled wide opening inlet and outlet valves, an exteriorly accessible actuating handle for closing the inlet valves and opening the outlet valve. Also actuating a counter to record the number of drinks measured in the chamber and delivered through the spout.

CROSS REFERENCE TO RELATED PATENT

This invention relates to improvements in the dispenser of my prior U.S. Pat. No. 2,504,145, issued Apr. 18, 1950.

BACKGROUND OF THE INVENTION

Field of the invention

This invention relates to drink dispensers and counters in which a reciprocable valve control element is employed which actuates a counter.

Description of the prior art

Various dispensing devices for alcoholic beverages have heretofore been proposed but these have had various shortcomings.

One such dispenser is shown in my prior patent No. 2,504,145.

While the structure there disclosed is satisfactory it has shortcomings which are overcome by the present invention.

In the structure of my prior patent there was a time delay in filling the measuring chamber and in the delivery therefrom which are not found in my present invention. In the prior structure also the actuation of the counter left something to be desired. The structure of the present invention is also simplified and easier to assemble, the number of springs employed being reduced and the disposition of the springs being improved.

SUMMARY OF THE INVENTION

In accordance with the invention a drink dispenser and counter is provided which includes a housing with a spout and with a measuring chamber therein with spaced valves actuated by a longitudinally movable valve control rod, the rod being cam actuated upon movement of a manual operating handle, movement of the cam carrier actuating the counter.

It is the principal object of the present invention to provide a drink dispenser and counter for dispensing a measured quantity of liquid and counting each dispensing operation and which is simple in construction, and free from the likelihood of operating difficulties.

It is a further object of the present invention to provide a dispenser of the character aforesaid which will be rapid in the filling of its measuring chamber and in the controlled discharge therefrom.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
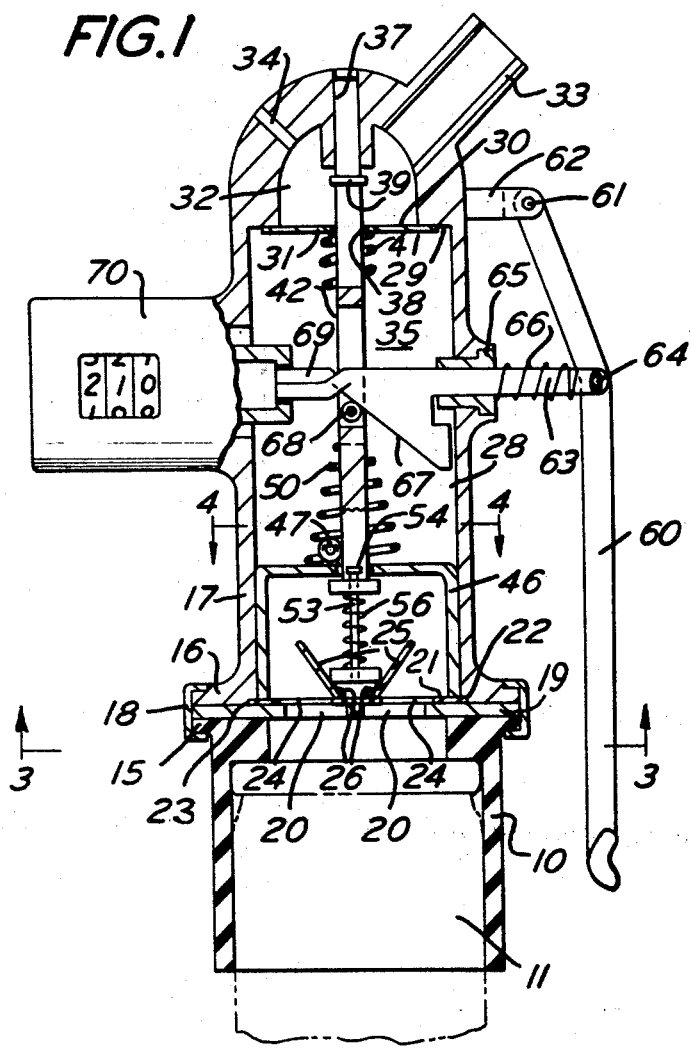
FIG. 1 is a vertical central sectional view of a drink dispenser and counter in accordance with the invention.
Figure 2:
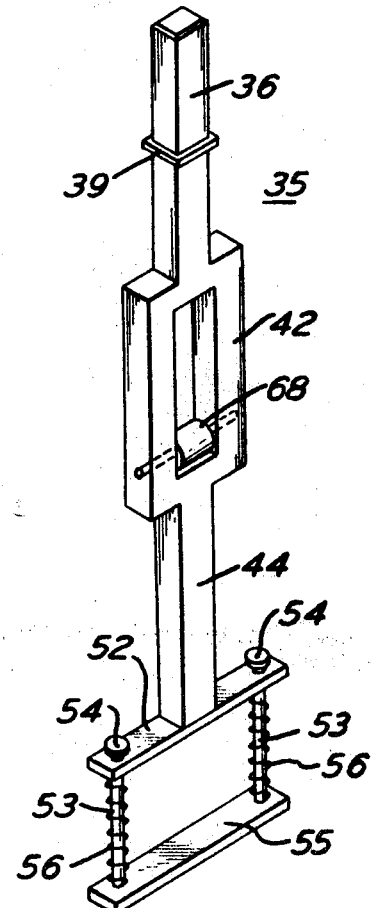
FIG. 2 is a perspective view, enlarged of the longitudinally movable actuator.
Figure 3:
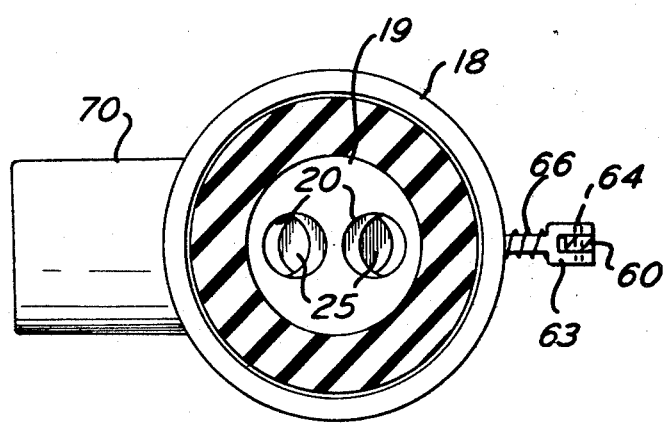
FIG. 3 is a transverse sectional view, taken approximately on the line 3—3 of FIG. 1.
Figure 4:
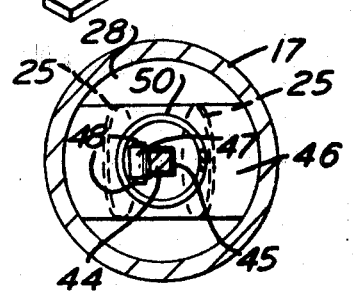
FIG. 4, is a transverse sectional view taken approximately on the line 4—4 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now particularly to the drawings a preferred embodiment of the invention is illustrated and is shown as having a collar portion 10 secured in any desired tamperproof manner to the neck 11 of a bottle whose contents are to be dispensed.

The specific manner of securing the collar portion 10 forms no part of the present invention.

The collar portion 10 has a rim 15 to which a rim 16 of a cylindrical housing 17 is secured, such as by a clamping and holding ring 18. The housing 17 can be of any desired material such as synthetic plastic. A mounting plate 19 is preferably clamped between the rims 15 and 16 and has a plurality of openings 20 for the liquid flow.

The mounting plate 19 has an inlet valve plate 21 engaged therewith. The plate 21 has an outer margin 22 which can be engaged in a recess 23 in the lower end of the housing 17.

The inlet valve plate 21 has a pair of openings 24 in communication with the openings 20 and a pair of valve discs 25 hingedly mounted on spring hinges 26 and which discs 25 are urged by the hinges 26 to open positions, as illustrated.

The housing 17 has a measuring chamber 28 therein, bounded at one end by the inlet valve plate 21 and at the other end by a transverse shoulder 29 which provides a valve seat and has a central opening 30.

A valve plate 31 controls flow through the opening 30. The housing 17, beyond the shoulder 29 has a discharge chamber 32 from which a spout 33 extends.

A vent opening 34 can be provided in the wall of and in communication with the discharge chamber 32 to speed up the liquid delivery through the spout 33 as hereinafter explained.

An actuator 35 is provided preferably having an upper stem portion 36, square in cross section and slidable in complemental opening 37 in the end of the housing 17.

The stem portion 36 extends through a complemental opening 38 in the valve plate 31 in slidable relation and has a rib 39 therearound to engage the valve plate 31 and move it away from a normally seated position on the shoulder 29 to an open position for liquid discharge into the discharge chamber 32 and then through the spout 33.

The actuator 35 has a bifurcated portion 42 and preferably has an anti-friction roller 68 carried thereby.

A light spring 41 is carried on the stem 36 and bears against valve plate 31 and the bifurcated portion 42.

Extending from the bifurcated portion 42 a lower stem 44 is provided, square in cross section and extending through an opening 45 in a transverse bracket 46 in the lower part of the measuring chamber 28. A guide roll 47 carried on brackets 48 can be provided to engage and guide the stem 44. A spiral coil spring 50 engaging the bracket 46 and the lower end of the bifurcated portion 42 normally urges the actuator 35 upwardly.

At the lower end of the stem 44 a bar 52 is preferably provided which slidably carries rods 53. The rods 53 have enlarged heads 54 to limit their downward movement and are secured at their lower ends to valve actuating bar 55. Springs 56 on the rods 53 normally urge the bar 55 downwardly, provide a resilient impelling of the bar 55, and permit relative movement of the bars 55 and 52. Downward movement of the bar 55 is effective to move the valve discs 25 to closed positions, against the force of the spring hinges 26.

In order to control the movement of the actuator 35 a lever 60 is provided pivoted at 61 on an arm 62 carried by the housing 17.

The lever 60 has a rod 63 connected thereto by a pivot 64 and extends through a gland 65 into the chamber 28. A spring 66 on the rod 63 normally urges the rod 63 outwardly as seen in FIG. 1. The rod 63 within the chamber 28, carries a cam 67 which engages the roller 68 mounted in the bifurcated portion 42 for impelling the actuator 35 downwardly.

The inner end of the rod 63 has an actuating portion 69 for a counter 70 of any suitable type for a single digit advance upon each actuation and return of the lever 60, and which displays the total corresponding to its actuation.

The mode of operation will now be pointed out.

With the drink dispenser and counter in place on neck 11 for a bottle, the bottle is inverted or tilted to permit liquid from the bottle to pass through the openings 20 and 24 into the measuring chamber 28 to fill the same. The filling will occur rapidly because of the area available at the openings 20 and 24 with the valve discs 25 in open position.

The lever 60 is then moved to impel the rod 63 inwardly, against the force of the spring 66. Inward movement of the rod 63 causes the cam 67 to move the actuator 35, by engagement of the cam 67 with the roller 68. The actuator 35 moves the bar 52 to apply a closing force through the bar 55 which is urged by the springs 56 to cause the valve discs 25 to be moved to closed position. As this closing occurs a measured quantity of liquid is trapped in the measuring chamber 28, and further movement of the actuator 35 is effective, by engagement of the rib 39 with the valve plate 31 to move it away from the shoulder 29, permitting liquid to flow through the discharge chamber 32 and spout 33 into the glass or other receptacle for consumption.

The vent 34 prevents liquid being locked in the discharge chamber 32 and facilitates the liquid discharge through the spout 33.

The bottle is then turned upright and the lever 60 released and permitted to return urged by the spring 66 to its initial position.

The cycle of movement of the lever 60, through the counter actuator 69 is effective at the counter 70 to indicate one cycle and thus one measured delivery of liquid.

I claim:
1. A drink dispenser for bottles comprising:
a housing adapted to be secured at one end to the neck of a bottle, and
said housing at the other end having a spout for liquid delivery,
said housing intermediate its ends having a measuring chamber with a shoulder at the outlet end of the chamber facing the inlet end and a valve mounting plate at the inlet end of the chamber,
a valve member for engagement with said shoulder and movable from said shoulder towards said inlet end for liquid delivery,
said valve mounting plate having openings therethrough and normally open valve members carried thereby and movable to positions to close said openings,
an actuator member resiliently impelled to a position for permitting opening of said valve plate carried valve members,
a manually operable control member carried on the exterior of said housing,
a rod pivotedly connected to said control member and extending interiorly into said measuring chamber,
operating connections between said rod and said actuator member,
an operating connection between said actuator member and said valve member, and
operating connections between said actuator member and said valve plate carried valve members.
2. A drink dispenser as defined in claim 1 in which:
a counter is mounted on said housing and
operating connections are provided between said rod and said counter.
3. A drink dispenser as defined in claim 1 in which:
said valve plate carried valve members are hingedly mounted on said valve plate.
4. A drink dispenser as defined in claim 3 in which:
the hinged mountings for said valve members are spring hinges.
5. A drink dispenser as defined in claim 1 in which:
said housing beyond said measuring chamber has a discharge chamber with which said spout is in communication, and
said discharge chamber has a vent opening communicating therewith.
6. A drink dispenser as defined in claim 1 in which said actuator member includes a stem portion and the operating connections between said actuator member and said valve members include:
spaced bars one of which is carried by said stem portion and the other of which is resiliently carried by the other of said bars.

References Cited

UNITED STATES PATENTS

| | | | |
|---|---|---|---|
| 2,106,649 | 1/1938 | Officer | 222—447X |
| 2,504,145 | 4/1950 | Morrone | 222—38 |
| 3,419,187 | 12/1968 | Bazaranic | 222—36 |

SAMUEL F. COLEMAN, Primary Examiner

L. MARTIN, Assistant Examiner

U.S. Cl. X.R.

222—447